(12) United States Patent
Moheban et al.

(10) Patent No.: US 9,459,651 B2
(45) Date of Patent: Oct. 4, 2016

(54) MULTI-LEVEL CLOCK SIGNAL DISTRIBUTION NETWORK AND INTEGRATED CIRCUIT

(75) Inventors: Lior Moheban, Nes Ziona (IL); Avi Elazary, Hod Hasharon (IL); Amir Nave, Yavne (IL); Noam Sivan, Ganey Tikva (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/349,690

(22) PCT Filed: Nov. 4, 2011

(86) PCT No.: PCT/IB2011/054929
§ 371 (c)(1),
(2), (4) Date: Apr. 4, 2014

(87) PCT Pub. No.: WO2013/064868
PCT Pub. Date: May 10, 2013

(65) Prior Publication Data
US 2014/0247080 A1  Sep. 4, 2014

(51) Int. Cl.
*G06F 1/04*  (2006.01)
*H03K 3/00*  (2006.01)
*G06F 1/10*  (2006.01)
*H04L 7/00*  (2006.01)

(52) U.S. Cl.
CPC ............... *G06F 1/10* (2013.01); *H04L 7/0008* (2013.01)

(58) Field of Classification Search
CPC ............................... G06F 1/10; H03K 19/003
USPC .................................................. 327/291–297
See application file for complete search history.

(56) References Cited

U.S. PATENT DOCUMENTS

| 5,109,168 A * | 4/1992 | Rusu | G06F 1/10 |
| | | | 326/47 |
| 5,656,963 A * | 8/1997 | Masleid | H03K 19/00323 |
| | | | 257/208 |

(Continued)

OTHER PUBLICATIONS

International Search Report and Written Opinion correlating to PCT/IB2011/054929 dated Jul. 31, 2012.

*Primary Examiner* — Sibin Chen
*Assistant Examiner* — Metasebia Retebo

(57) ABSTRACT

A multi-level clock signal distribution network comprises a plurality of lower network levels comprising at least a first lower network level and a lowermost network level that is connected to one or more lowermost clock signal driving circuits connectable to receive a clock signal; and a topmost network level arranged to distribute the clock signal to a plurality of clocked circuits, and connected to a plurality of topmost clock signal driving circuits connected to receive the clock signal from the first lower network level. The lowermost network level comprises at least one net and each of the plurality of lower network levels except the lowermost network level comprises a plurality of nets and is connected to a corresponding plurality of lower clock signal driving circuits being connected to receive the clock signal from a subjacent one of the plurality of lower network levels, wherein each of the plurality of nets is driven by all nets of the subjacent one.

10 Claims, 2 Drawing Sheets

(56) References Cited

U.S. PATENT DOCUMENTS

| | | | |
|---|---|---|---|
| 6,255,884 B1 * | 7/2001 | Lewyn | G06F 1/10 327/293 |
| 6,696,863 B2 | 2/2004 | Yamamoto et al. | |
| 7,392,495 B1 | 6/2008 | Cherukupalli et al. | |
| 2002/0105367 A1 | 8/2002 | Mizuno | |
| 2003/0011413 A1 | 1/2003 | Masleid | |
| 2004/0196081 A1 | 10/2004 | Srinivasan et al. | |
| 2008/0030252 A1 * | 2/2008 | Cheng | H03K 5/15013 327/292 |
| 2009/0237134 A1 | 9/2009 | Hwang et al. | |

* cited by examiner

MULTI-LEVEL CLOCK SIGNAL DISTRIBUTION NETWORK AND INTEGRATED CIRCUIT

FIELD OF THE INVENTION

This invention relates to a multi-level clock signal distribution network and an integrated circuit.

BACKGROUND OF THE INVENTION

A clock signal is a signal that oscillates between two states and is used to trigger actions of synchronous digital circuits, i.e. clocked circuits. A signal may be a time varying physical quantity carrying information, e.g. a varying voltage level. In an integrated circuit, for example, many circuit elements or devices, such as for example, flip-flop circuits or memory circuits, may operate synchronously with a clock signal. The clock signal may usually be generated by a clock source or clock generator circuit, for example a local oscillator circuit.

In order to serve as a common trigger and time reference for the connected synchronous circuits, the same clock signal is distributed to all connected circuits that require the clock signal. A clock signal distribution network, which may, for example, be organized as a clock tree with the connection to the clock source as root, branches, and leafs connected to the clocked circuits, may be used to distribute the clock signal from the clock source or a common point connected to the clock source to the clocked circuits.

Since the synchronized, clocked circuits and generated data signals refer to the clock signal as a temporal reference, the clock waveforms must be particularly sharp. Due to, for example, different lengths of nets, i.e. connecting lines or wirings, between the clock source and the clocked circuits, or differences between their physical characteristics, a difference between periods of time for the clock signal to reach each of the clocked circuits may occur, which may be referred to as clock skew. Too large clock skew may, for example, confuse timing between input and output of clocked circuits and may result in wrong behavior of the clocked circuits or of an integrated circuit containing the clocked circuits and the clock signal distribution network.

Since clock skew depends, for example, on the dimensions of the circuits and wirings, clock skew handling may be especially important for small semiconductor processes where large process variations on the integrated circuit die may occur.

A clock distribution network may contain clock signal driving circuits, for example clock buffers, inverters, e.g., two serially connected inverter circuits, or any other circuits capable of driving signals, for providing a received clock signal to connected wirings or nets with recovered waveform and improved timing. At the same time, the clock signal driving circuits are subject to variation caused by process imperfections.

In order to improve, for example, setup and hold timing of an integrated circuit design, it may contain clock skew handling circuitry. For example, in U.S. Pat. No. 6,696,863, a clock signal distribution circuit is shown that uses a mesh clock tree architecture for reducing the clock skew. A clock tree architecture is used for distributing a clock signal to the connected clocked circuits, wherein the last, i.e. the highest or topmost, level of the clock tree, that contains tree leafs connected to the clocked circuits has the leaf nets interconnected with each other in a mesh grid structure. In U.S. Pat. No. 7,392,495, a block structure of local balanced clock trees with blocks connected in a mesh grid structure is shown.

SUMMARY OF THE INVENTION

The present invention provides a multi-level clock signal distribution network and an integrated circuit as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, as illustrated, for the understanding and appreciation of the underlying concepts of the present invention and in order not to obfuscate or distract from the teachings of the present invention.

Figure 1:
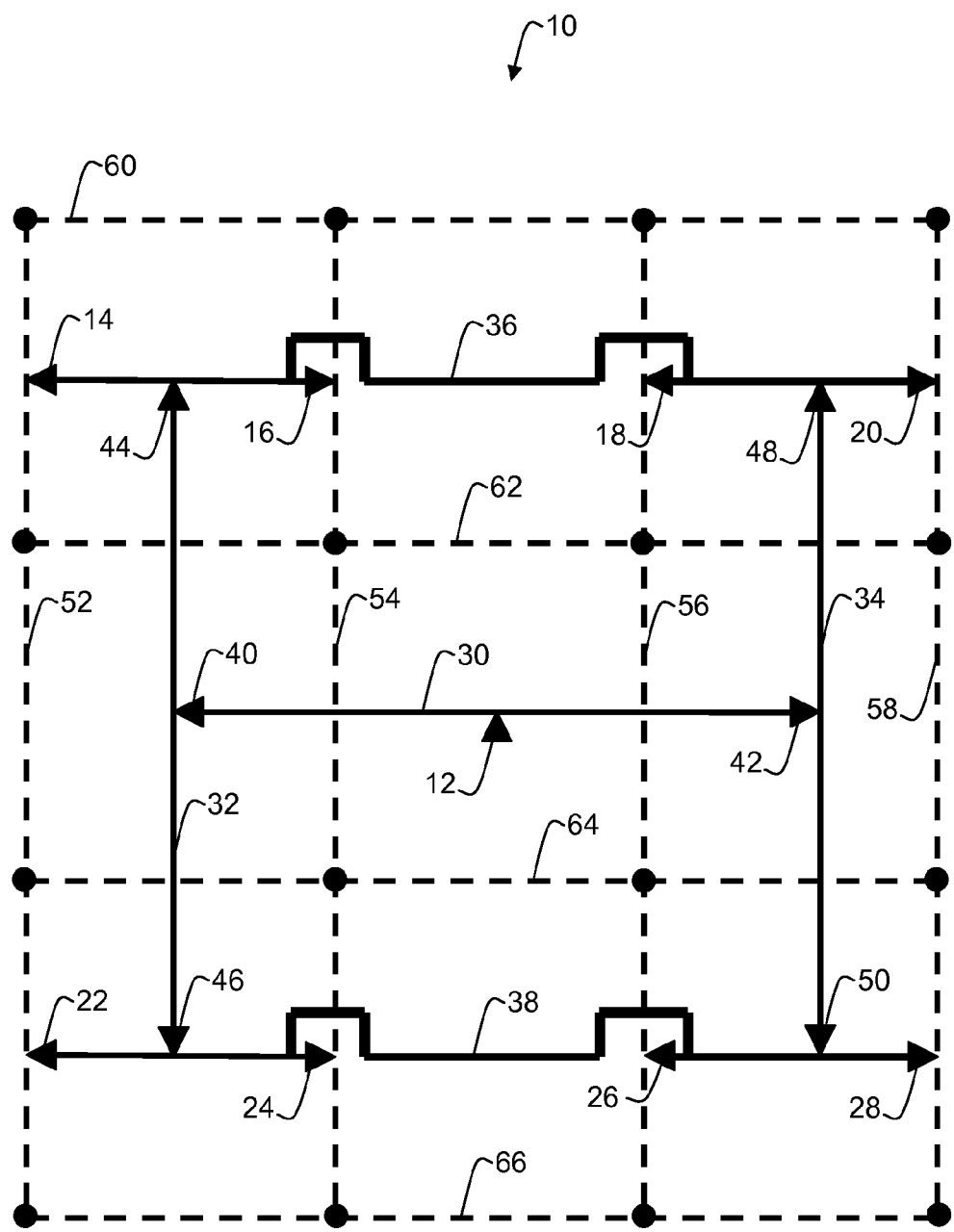
FIG. 1 schematically shows an example of a first embodiment of a multi-level clock signal distribution network.

Referring to FIG. 1, an example of a first embodiment of a multi-level clock signal distribution network is schematically shown. A multi-level clock signal distribution network 10 comprises a plurality of lower network levels comprising at least a first lower network level and a lowermost network level that is connected to one or more lowermost clock signal driving circuits 12 connectable to receive a clock signal; and a topmost network level arranged to distribute the clock signal to a plurality of clocked circuits, and connected to a plurality of topmost clock signal driving circuits 14, 16, 18, 20, 22, 24, 26, 28 connected to receive the clock signal from the first lower network level; wherein the lowermost network level comprises at least one net 30 and each of the plurality of lower network levels except the lowermost network level comprises a plurality of nets 32, 34; 36, 38 and is connected to a corresponding plurality of lower clock signal driving circuits 40, 42; 44, 46, 48, 50 being connected to receive the clock signal from a subjacent one of the plurality of lower network levels, wherein each of the plurality of nets is driven by all nets of the subjacent one.

The multi-level clock signal distribution network may comprise different levels, i.e. different layers, each containing nets, lines or wirings for distributing the clock signal, and being connected to its subjacent level for receiving the clock signal being propagated through the levels, starting from the lowermost level, which may be connected via one or more lowermost clock signal driving circuits 12 to a clock signal source, either directly or, for example, by means of an input terminal connected to an external clock source. The multi-level clock signal distribution network may comprise a topmost network level arranged to distribute the clock signal to connected clocked circuits, such as flip-flop circuits or memory circuits. The clocked circuits may, for example, be connected to the topmost network level nets through gated clocks.

All network levels except the topmost network level may be referred to as lower network levels. The plurality of lower network levels may comprise any amount of network levels, but at least two, the first lower network level, which is the network level arranged to provide the clock signal to the topmost network level, and the lowermost network level, which is the network level connected to receive the clock signal from a clock signal source (not shown), whereas all other network levels may receive the clock signal from their respective subjacent network level, i.e. their adjacent level below. The lowermost network level, for example, may be the subjacent network level for lower network level two. The lowermost network level may not have a subjacent lower network level.

Each network level may comprise a plurality of nets or electrically connecting lines. Nets of a network level may generally be separate from each other or interconnected within the same level or layer. For example, as shown in FIG. 1, nets of lower network levels may not be connected with one another directly within the same level. For example, in FIG. 1, nets of lower network level two may not be connected directly, but indirectly, since they are both connected to and driven by the single net 30 of the lowermost network level. Lower network level three may comprise nets 36, 38 driven by lower network level two nets 32, 34. As shown, the lowermost network level one may comprise one single net 12. In another embodiment, the lowermost network level may comprise more than one net.

It should be noted that geometrically descriptive terms, for example, topmost, lowermost, lower and subjacent are used for descriptive purposes and not necessarily for describing permanent absolute or relative positions.

The term clock signal driving circuit may refer to all clock signal driving circuits used in a multi-level clock signal distribution network 10, whereas a topmost clock signal driving circuit may be a clock signal driving circuit connected to the topmost network level and arranged to distribute the clock signal to the nets 52, 54, 56, 58, 60, 62, 64, 66 of contained in the topmost network level after receiving the clock signal from its subjacent network level, i.e. the first lower level or lower level three. In FIG. 1, the topmost level nets are illustrated as dashed lines. A lowermost clock signal driving circuit 12 may be a clock signal driving circuit connected to receive the clock signal from a signal source (not shown) and distribute the clock signal within the lowermost network level using net 30. A lower clock signal driving circuit may be any clock signal driving circuit connected to a lower network layer and arranged to receive the clock signal from its respective subjacent lower network layer.

The described multi-level clock signal distribution network 10 may provide a reduced clock skew. By having each of the plurality of nets of each lower network level except the lowermost network level driven by all nets of the subjacent one, i.e. the respective subjacent lower network level, for example, clock skew accumulation may be avoided or at least reduced. This may avoid to propagate skew caused by different timing deviations in the different levels differently, which may occur, for example, for each branch of a common tree structure where the nets of a level are not driven by all of the nets of the respective subjacent level.

Driving each of the plurality of nets of each lower network level, except the lowermost network level, by all nets of the respective subjacent lower level may comprise that each of the nets of a subjacent lower network level provides the clock signal to each net of the next level, i.e. each net of a next level is connected to all the nets of its subjacent network level via respective lower clock signal driving circuits. Each level's net may be driven by all the nets of the subjacent network level through the level's clock signal driving circuits, but not through the subjacent level's clock signal driving circuits. With this architecture, the clock skew in each clock signal network level may be caused mainly or only by the clock signal driving circuits of the level. Each net of a certain lower network level may receive the same clock signal. Any possible timing shift may be the same or at least very similar for each of the nets of a respective network level. Clock skew, if any, may, for example, only be introduced by differences between topmost clock signal driving circuit characteristics at the topmost network level.

This may, for example, allow to save power, since contention on the nets of the topmost network level occurring probably with every clock edge under large clock skew conditions, resulting in an increased dynamic power consumption, may be reduced or avoided. Contention may occur when two or more clock signal driving circuits drive the same net, and during a certain period of time drive opposite values of the clock signal. During this period of driving opposite values, high dynamic power may be consumed. A reduction of dynamic power consumption may be used for providing less power to the integrated circuit or for less power consumption cells.

During the design phase of an integrated circuit development, static timing analysis (STA) simulations may become easier, allowing for more accurate setup and hold timing of the circuit under development.

Reduced clock skew may also allow for an increase of the clock signal frequency and for driving the clocked circuits, which may be comprised in an integrated circuit, at a higher frequency of operation.

In the embodiment shown in FIG. 1, the topmost network level of the multi-level clock signal distribution network 10 may comprise a plurality of nets 52, 54, 56, 58, 60, 62, 64, 66, shown as dashed lines, connected, i.e. electrically connected, to form a mesh grid. This may allow further decrease of any remaining clock skew encountered at the topmost network level.

As shown in FIG. 1, in this embodiment only nets of the topmost network level may be connected directly within the same level, whereas nets of the plurality of nets comprised in each of the plurality of lower network levels may not be directly connected with one another within the same lower network level. This may include that the lowermost network level may comprise, for example, only a single net 30, which cannot be connected with another net within the same level.

For example, in FIG. 1, nets 32, 34 of lower network level two may be connected indirectly, since they are both connected to and driven by the only net 30 of the lowermost network level.

The nets of the plurality of nets comprised in each of the plurality of lower network levels may be arranged in parallel with one another, for example, at predetermined intervals.

This may allow for a die area efficient, low resistant, easy-to-implement network implementation. In case the lowermost level comprises only a single net, it may be considered being in parallel with itself.

In order to, for example, avoid crosstalk between nets located in different network levels and to create a structure with well-defined intersections, the nets of the plurality of nets comprised in each of the plurality of lower network levels except the lowermost network level may be arranged in a first direction differing from a second direction of the nets located in the subjacent one of the plurality of lower network levels by a constant angle.

The constant angle may be any angle, for example 45 degree or, as shown with the embodiment illustrated in FIG. 1, the constant angle may be a right angle, i.e., a 90 degree angle, providing a horizontal and vertical or perpendicular routing of nets belonging to a particular network level and its subjacent network level.

The plurality of lower clock signal driving circuits comprised in each of the plurality of lower network levels except the lowermost network level may be located at junctions between the nets comprised in each of the plurality of lower network levels and the subjacent one of the plurality of lower network levels. The clock signal driving circuits of each respective network level may provide the connections to the corresponding subjacent network level. With this architecture, clock skew in each network level may be caused only by the clock signal driving circuits of the network level.

Each of the plurality of lower network levels except the lowermost network level may comprise at least as many nets as its subjacent one. In other words, no subjacent network level may comprise more nets than the adjacent level above. This may allow for an efficient implementation and may keep the total length of nets used in the network short and may support low delay clock signal propagation.

Figure 2:
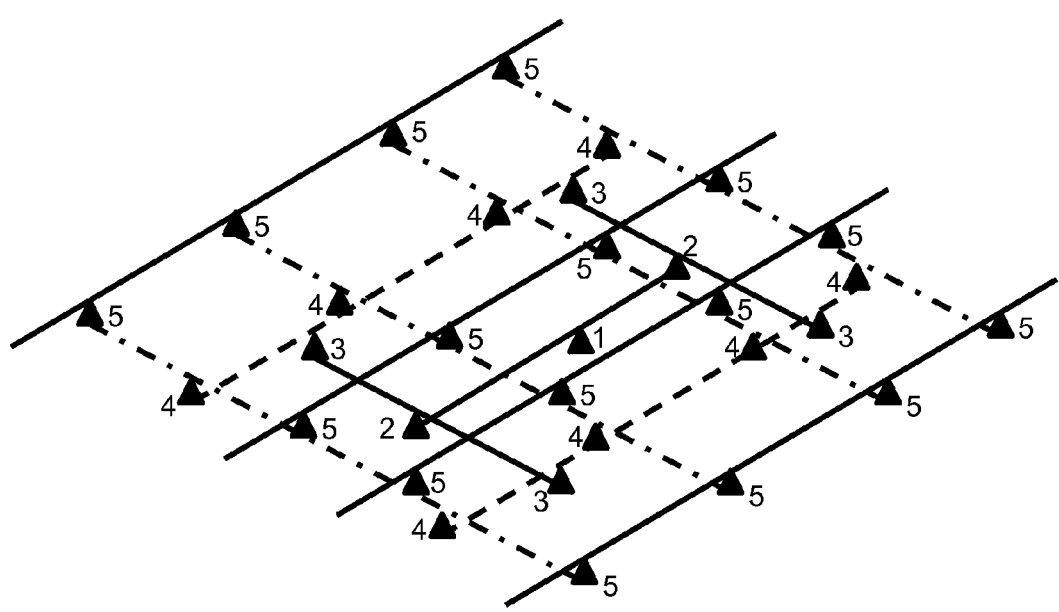
FIG. 2 schematically shows an example of a second embodiment of a multi-level clock signal distribution network.

Referring to FIG. 2, an example of a second embodiment of a multi-level clock signal distribution network is schematically shown. The multi-level clock signal distribution network may comprise six networks levels, wherein, for enhanced clarity, the topmost network level, which may comprise nets connected to form a mesh grid, has not been drawn. Only lower network levels are shown. In a multi-level clock signal distribution network, the plurality of lower network levels may comprise at least two network levels, the first lower network level and the lowermost network level. In some embodiments, the plurality of lower network levels may comprise at least three network levels, especially when distributing the clock signal to a large number of clocked circuits located on a relatively large integrated circuit die. With increased amount of network levels, a clock signal distribution network may generally encounter increasing clock skew due to the increased amount of components participating in the clock signal distribution network, and the clock skew reduction achieved by the shown architecture may become even more valuable. For example, as shown in FIG. 2, it may comprise 5 lower network levels. In other embodiments, it may comprise any other amount of network levels, for example 9 or 10.

For enhanced clarity, no reference numbers for particular nets are provided and the reference number 1, 2, 3, 4, and 5, respectively refer to clock signal driving circuits connecting a net of a subjacent lower network level to a network level with a number corresponding to the reference number. For example, lower clock signal driving circuits 5 may connect level 5 nets to level 4 nets, lower clock signal driving circuits 4 may connect level 4 nets to level 3 nets, lower clock signal driving circuits 3 may connect level 3 nets to level 2 nets and lower clock signal driving circuits 2 may connect level 2 nets to the level 1 net. Clock signal driving circuit 1 may connect the level 1 net, i.e. the lowermost level net, to a clock source. For illustration purposes, level 3 nets and level 4 nets are drawn using dashed lines. With the shown structure, for example, each level 5 net may be driven by all level 4 nets and a skew between level 5 nets may be caused only by level 5 network signal driving circuits.

In another embodiment (not shown), one or more of the plurality of lower network levels except the lowermost network level may comprise their respective plurality of nets connected to form a mesh grid. In other words, a mesh grid may be used for one or more lower network levels.

Figure 3:
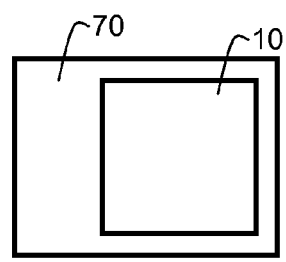
FIG. 3 schematically shows an example of an embodiment of an integrated circuit.

Referring to FIG. 3, an example of an embodiment of an integrated circuit 70 is schematically shown. The integrated circuit 70 comprises a multi-level clock signal distribution network 10 as described above.

For example, the integrated circuit 70 may be a processing device, such as for example, a central processing unit (CPU), a digital signal processor (DSP), a microcontroller unit (MCU), or a multimedia processor or graphics processing unit (GPU), just to name a few.

A computer program product may comprise code portions for implementing parts of a multi-level clock signal distribution network as described above when run on a programmable apparatus. The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources.

An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

For example, the semiconductor substrate described herein can be any semiconductor material or combinations of materials, such as gallium arsenide, silicon germanium, silicon-on-insulator (SOI), silicon, monocrystalline silicon, the like, and combinations of the above.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, each clock signal driving circuit may be provided as a plurality of clock signal driving circuits connected in parallel.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, clocked circuits, multi-level clock signal distribution network and clock source may be provided within a same device. Alternatively, the examples may be implemented as any number of separate integrated circuits or separate devices interconnected with each other in a suitable manner. For example, the multi-level clock signal distribution network 10 may be provided, completely or partly, as an integrated circuit separate from the clocked devices or the clock source.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only of way of example and not as a limitation on the scope of the invention.

The invention claimed is:

1. A multi-level clock signal distribution network, comprising
a lowermost network level connected to a lowermost clock signal driving circuit to receive a clock signal, wherein the lowermost network level comprises a first net;
a plurality of lower network levels, wherein each lower network level comprises a plurality of nets and is connected to a corresponding plurality of lower clock signal driving circuits to receive the clock signal from a subjacent lower network level of the plurality of lower network levels such that each of the plurality of nets of a particular lower network level is driven by all nets of the subjacent lower network level, and wherein the plurality of lower network levels includes a first lower network level that is subjacent to a second lower network level; and
a topmost network level connected to a plurality of clocked circuits to distribute the clock signal to the plurality of clocked circuits, and connected to a plurality topmost clock signal driving circuits to receive the clock signal from the second lower network level;
wherein the nets of said plurality of nets comprised in each of said of lower network levels except said lowermost network level are arranged in a first direction differing from a second direction of the nets located in said subjacent one of said plurality of lower network levels by a constant forty-five degree angle.

2. The multi-level clock signal distribution network as claimed in claim 1, wherein said topmost network level comprises a plurality of nets connected to form a mesh grid.

3. The multi-level clock signal distribution network as claimed in claim 1, wherein the nets of said plurality of nets comprised in each of said plurality of lower network levels are not directly connected with one another within the same lower network level.

4. The multi-level clock signal distribution network as claimed in claim 1, wherein the nets of said plurality of nets comprised in each of said plurality of lower network levels are arranged in parallel with one another.

5. The multi-level clock signal distribution network as claimed in claim 1, wherein said plurality of lower clock signal driving circuits comprised in each of said plurality of lower network levels except said lowermost network level are located at junctions between the nets comprised in each of said plurality of lower network levels and said subjacent one of said plurality of lower network levels.

6. The multi-level clock signal distribution network as claimed in claim 1, wherein each of said plurality of lower network levels except said lowermost network level comprises at least as many nets as its subjacent one.

7. The multi-level clock signal distribution network as claimed in claim 1, wherein said plurality of lower network levels comprises at least three network levels.

8. The multi-level clock signal distribution network as claimed in claim 1, wherein one or more of said plurality of lower network levels except said lowermost network level comprise their respective plurality of nets connected to form a mesh grid.

9. An integrated circuit, comprising a multi-level clock signal distribution network as claimed in claim 1.

10. The integrated circuit as claimed in claim 9, wherein said integrated circuit is a processing device.

* * * * *